(12) United States Patent
Koester et al.

(10) Patent No.: US 12,129,853 B2
(45) Date of Patent: Oct. 29, 2024

(54) FLUID FILTER FOR A COMPRESSOR

(71) Applicant: Hanon Systems, Daejeon (KR)

(72) Inventors: Steven J. Koester, Toledo, OH (US); Bradley Vernon Crenshaw, Riverview, MI (US); Mark Elliot Honkala, Howell, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/065,321

(22) Filed: Dec. 13, 2022

(65) Prior Publication Data

US 2023/0358233 A1    Nov. 9, 2023

Related U.S. Application Data

(60) Provisional application No. 63/364,278, filed on May 6, 2022.

(51) Int. Cl.
| | | |
|---|---|---|
| *B01D 46/00* | (2022.01) |
| *B01D 35/02* | (2006.01) |
| *B01D 35/027* | (2006.01) |
| *B01D 35/26* | (2006.01) |
| *F04C 18/02* | (2006.01) |
| *F04C 29/00* | (2006.01) |
| *F04C 29/02* | (2006.01) |

(52) U.S. Cl.
CPC .......... *F04C 29/0092* (2013.01); *B01D 35/02* (2013.01); *B01D 35/027* (2013.01); *B01D 35/0273* (2013.01); *B01D 35/0276* (2013.01); *F04C 18/0207* (2013.01); *F04C 2240/30* (2013.01)

(58) Field of Classification Search
CPC .... F04C 29/0092; F04C 29/02; F04C 29/026; F04C 29/028; B01D 35/02; B01D 35/027; B01D 35/0273; B01D 35/0276; F24F 13/28
See application file for complete search history.

(56) References Cited

U.S. PATENT DOCUMENTS

| | | | |
|---|---|---|---|
| 6,344,065 B1 | 2/2002 | Boulva | |
| 6,755,632 B1 | 6/2004 | Ito et al. | |
| 6,849,179 B1 * | 2/2005 | Taylor | B01D 35/027 |
| | | | 184/6.24 |

(Continued)

FOREIGN PATENT DOCUMENTS

| | | | | |
|---|---|---|---|---|
| CN | 102308093 A | * | 1/2012 | .......... F04C 18/0215 |
| CN | 111911409 A | * | 11/2020 | .............. F04C 18/02 |

(Continued)

OTHER PUBLICATIONS

English translation of KR 20210015059 Mar. 24, 2023.*

(Continued)

*Primary Examiner* — Deming Wan
(74) *Attorney, Agent, or Firm* — Shumaker, Loop & Kendrick, LLP; James D. Miller

(57) ABSTRACT

A fluid filter includes a body portion and a filter membrane portion. The body portion includes at least one aperture formed therein, wherein the filter membrane portion is disposed in the at least one aperture to filter contaminants from a fluid (e.g., a lubricant). The fluid filter is installed in a fluid passage of scroll compressor, wherein an axial movement of the fluid filter is restrained.

9 Claims, 9 Drawing Sheets

(56) References Cited

U.S. PATENT DOCUMENTS

| | | |
|---|---|---|
| 8,202,071 B2 | 6/2012 | Kii et al. |
| 8,333,818 B2 | 12/2012 | Foerster et al. |
| 2013/0264265 A1 | 10/2013 | Lin |
| 2014/0178232 A1* | 6/2014 | Nagano ................ F04C 29/026 418/55.6 |
| 2018/0195505 A1* | 7/2018 | Ham ................... F04C 29/0092 |
| 2018/0230986 A1 | 8/2018 | Kim |

FOREIGN PATENT DOCUMENTS

| | | | | |
|---|---|---|---|---|
| EP | 1088720 A2 * | 4/2001 | ............. | B01D 29/15 |
| EP | 1464840 A1 * | 10/2004 | .......... | F04C 18/0215 |
| KR | 20210015059 A * | 7/2019 | ............. | B01D 35/02 |

OTHER PUBLICATIONS

English CN 102308093 by PE2E Dec. 13, 2023.*
English EP-1088720 by PE2E Dec. 13, 2023.*
English translation of EP1464840 by PE2E Mar. 27, 2024.*
English translation of CN11911409 by PE2E Mar. 27, 2024.*

* cited by examiner

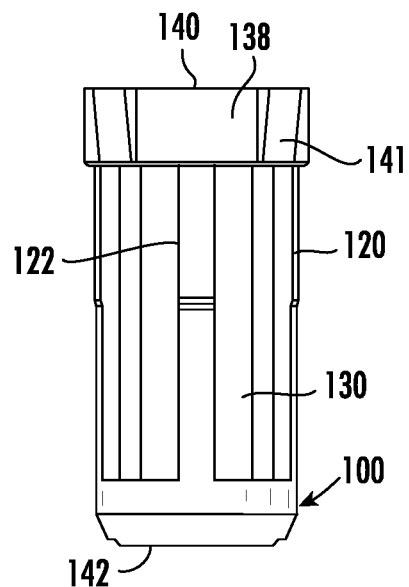
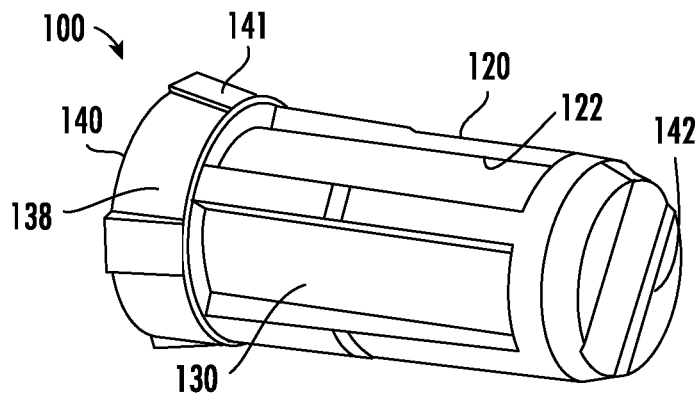
FIG. 8A
FIG. 8B
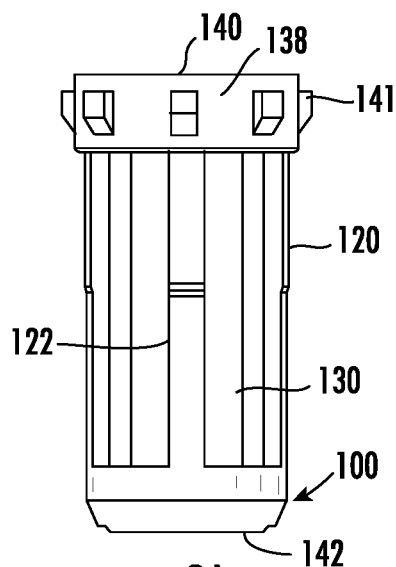
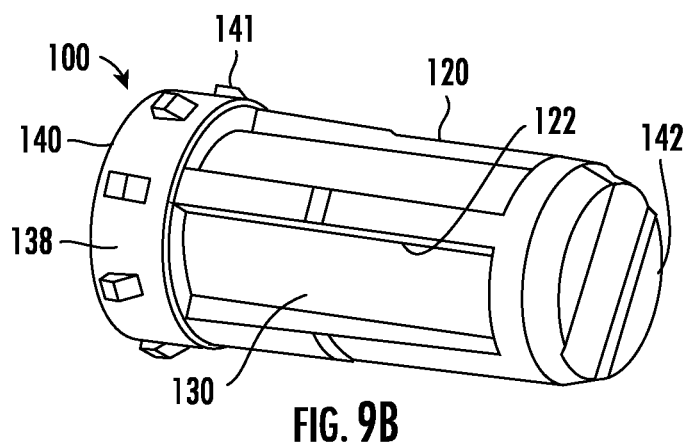
FIG. 9A
FIG. 9B

FLUID FILTER FOR A COMPRESSOR

CROSS-REFERENCE TO RELATED APPLICATION

This application claims the benefit of U.S. Provisional Patent Application Ser. No. 63/364,278, filed May 6, 2022, the entirety of which is herein incorporated by reference.

FIELD

The present disclosure relates to a fluid filter, and more particularly a fluid filter for a compressor.

BACKGROUND

Known scroll compressors include a housing, and the housing includes a front housing, a shell, and a rear housing. Such known compressors also include a fixed scroll-including a first spiral element, and an orbiting scroll including a second spiral element. The spiral elements interfit with one another to form a sealed-off fluid pocket. Such known compressors further include a driving mechanism which drives the orbiting scroll in an orbiting motion, and a rotation preventing mechanism which prevents the orbiting a scroll from rotating. The orbiting scroll, the fixed scroll, the driving mechanism, and the rotation preventing mechanism are positioned inside the housing. Further, such known compressors also include a suction chamber and a discharge chamber, and the fixed scroll separates the suction chamber from the discharge chamber. The driving mechanism and the rotation preventing mechanism are positioned inside the suction chamber.

In the known compressor, a refrigerant gas is introduced into the suction chamber via an external refrigerant circuit. Moreover, a fluid suspended in the refrigerant gas lubricates the driving mechanism, the rotation preventing mechanism, and sliding portions located between the fixed scroll and the orbiting scroll. Specifically, during operation, the fluid separates from the refrigerant gas, and accumulates in a lower portion of the compressor. This accumulated fluid lubricates the driving mechanism, the rotation preventing mechanism, and the sliding portions located between the fixed scroll and the orbiting scroll.

Fluid filters are used to filter undesired contaminants from the fluid. For different compressor designs, the fluid filter location may change, requiring multiple filter designs or design compromises to the fixed scroll and rear scroll. A conventional scroll compressor is shown and described in U.S. Pat. No. 8,202,071, hereby incorporated herein by reference in its entirety.

There exists a need for a fluid filter which is easy to install and may be used in a variety of compressor designs.

SUMMARY

In concordance and agreement with an embodiment of the present disclosure, an improved a fluid filter which is easy to install and may be used in a variety of compressor designs is surprisingly discovered.

In one embodiment, a fluid filter for a compressor, comprises: a body portion including at least one retention feature configured to permit the fluid filter to be fixedly coupled in a compressor at a desired position; and a membrane portion at least partially disposed in the body portion.

In some embodiments, the body portion further includes at least one aperture formed therein.

In some embodiments, the at least one retention feature is configured to cooperate with a surface of the compressor to form a substantially fluid-tight seal therebetween.

In some embodiments, the at least one retention feature is configured to be received in a channel portion of a fluid passage of the compressor to militate against movement of the fluid filter.

In some embodiments, the at least one retention feature is at least one radially outwardly extending protuberance.

In some embodiments, the at least one retention feature is at least one radially outwardly extending ring.

In some embodiments, the at least one retention feature is an annular array of spaced apart protuberances.

In some embodiments, the at least one retention feature is formed continuously around an outer surface of the body portion.

In some embodiments, the at least one retention feature includes a sloped portion to facilitate installation of the fluid filter in the compressor.

In some embodiments, the body portion further includes at least one leg extending outwardly therefrom.

In another embodiment, a compressor, comprises: a housing including a fluid passage formed therein; and a fluid filter disposed in the fluid passage, wherein the fluid filter includes: a body portion including at least one retention feature configured to permit the fluid filter to be fixedly coupled at a desired position within the fluid passage; and a membrane portion at least partially disposed in the body portion.

In some embodiments, the at least one retention feature is configured to cooperate with a surface of the fluid passage to form a substantially fluid-tight seal therebetween.

In some embodiments, the at least one retention feature is configured to be received in a channel portion of the fluid passage of the compressor to militate against movement of the fluid filter.

In some embodiments, the at least one retention feature is at least one radially outwardly extending protuberance.

In some embodiments, the at least one retention feature is an annular array of spaced apart protuberances.

In some embodiments, the at least one retention feature is formed continuously around an outer surface of the body portion.

In some embodiments, the at least one retention feature includes a sloped portion to facilitate installation of the fluid filter in the compressor.

In some embodiments, the body portion further includes at least one leg extending outwardly therefrom.

In some embodiments, the fluid passage includes a cylindrical portion, a frustoconical portion, and a channel portion.

In yet another embodiment, a compressor, comprises: a housing including a fluid passage having a channel portion; and a fluid filter disposed in the fluid passage, wherein the fluid filter includes at least one retention feature configured to be received in the channel portion of the fluid passage, and wherein a location of the channel portion provides a desired position of the fluid filter to adjust a desired backpressure flow in the compressor.

The disclosure includes a fluid filter as shown and described herein and a scroll type compressor including a fluid filter as shown and described herein.

BRIEF DESCRIPTION OF THE DRAWINGS

Further details, features and advantages of configurations of the present disclosure emerge from the following description of exemplary embodiments with reference to the associated figures:

FIG. 8A is an enlarged elevational view of another embodiment of the fluid filter for the scroll compressors shown in FIGS. 4 and 5;

FIG. 8B is an enlarged perspective view of the fluid filter shown in FIG. 8A;

FIG. 9A is an enlarged elevational view of another embodiment of the fluid filter for the scroll compressors shown in FIGS. 4 and 5;

FIG. 9B is an enlarged perspective view of the fluid filter shown in FIG. 9A;

DETAILED DESCRIPTION

The following detailed description and appended drawings describe and illustrate various embodiments of the present disclosure. The description and drawings serve to enable one skilled in the art to make and use the present disclosure, and are not intended to limit the scope of the present disclosure in any manner. In respect of the methods disclosed, the steps presented are exemplary in nature, and thus, the order of the steps is not necessary or critical.

A" and "an" as used herein indicate "at least one" of the item is present; a plurality of such items may be present, when possible. Spatially relative terms, such as "front," "back," "inner," "outer," "bottom," "top," "horizontal," "vertical," "upper," "lower," "side," "above," "below," "beneath," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

As used herein, substantially is defined as "to a considerable degree" or "proximate" or as otherwise understood by one ordinarily skilled in the art or as otherwise noted. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section.

Figure 1:
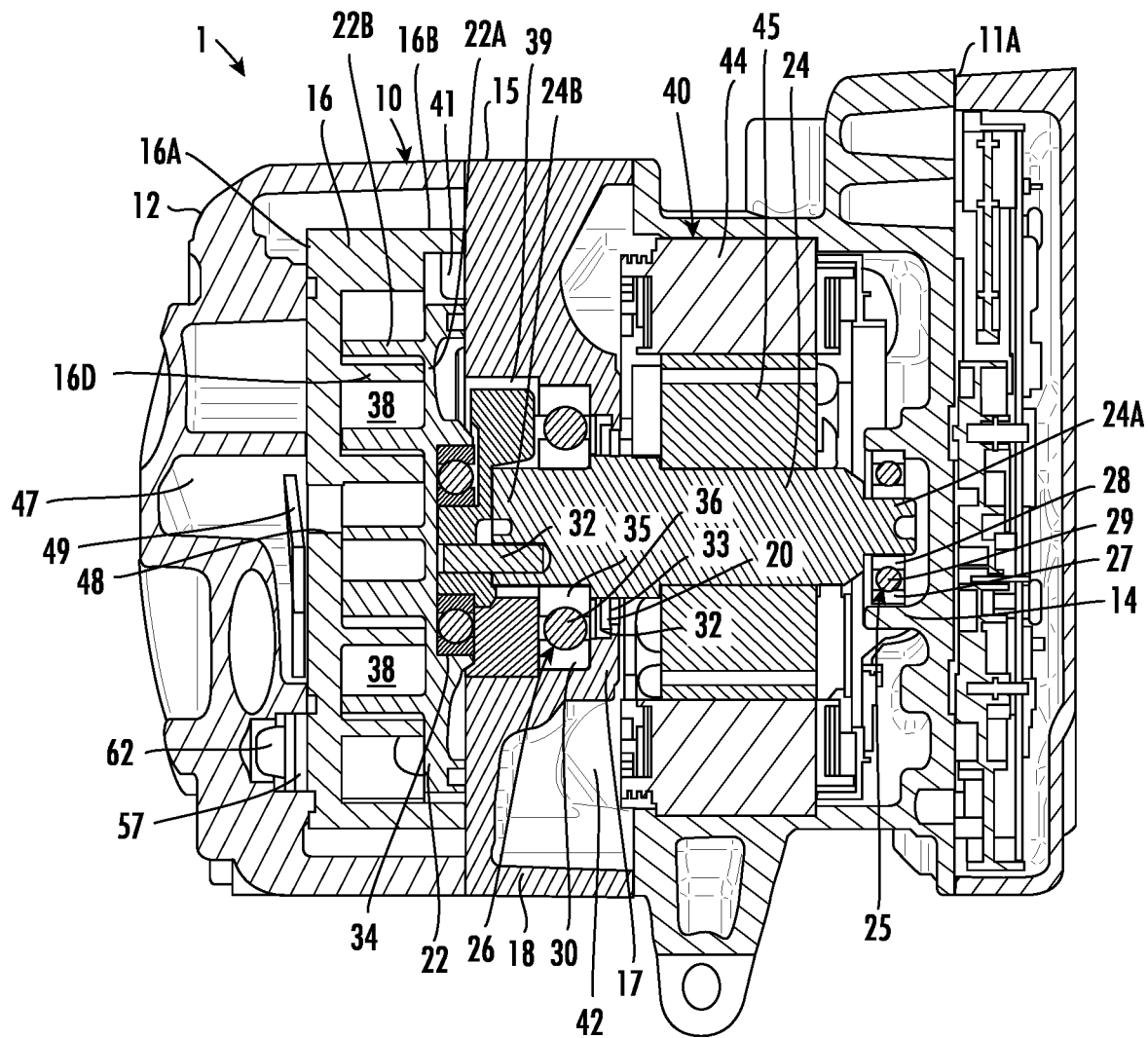
FIG. 1 is a cross sectional elevational view of a conventional scroll compressor.
Figure 2:
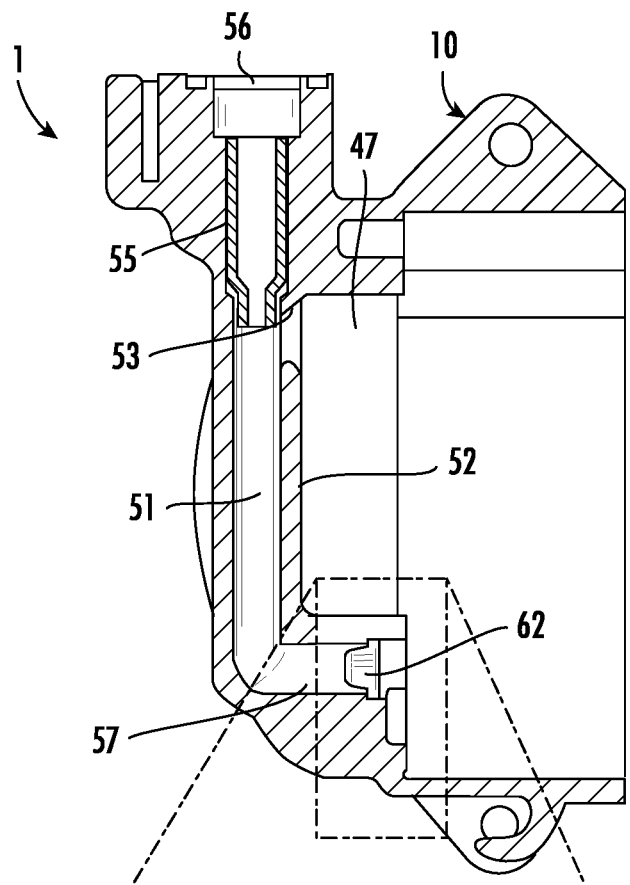
FIG. 2 is a fragmentary cross-sectional view of a portion of the scroll compressor of FIG. 1.
Figure 3:
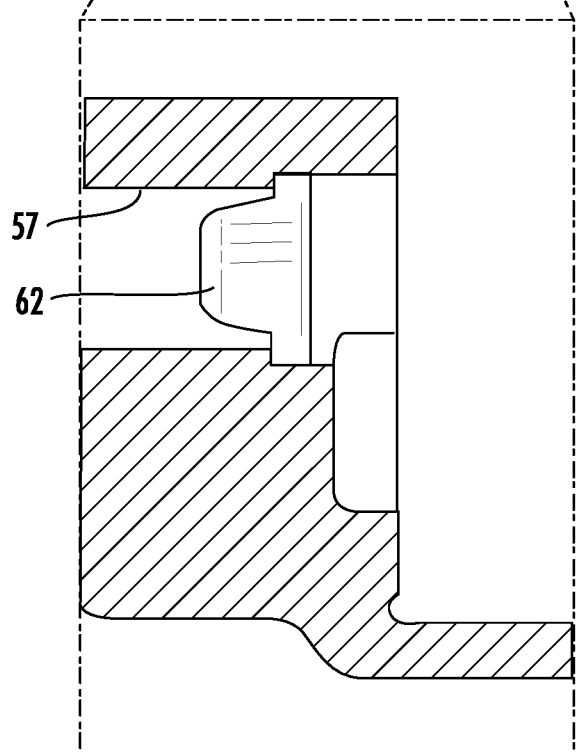
FIG. 3 is an enlarged cross-sectional view of a portion of the scroll compressor shown within Rectangle A of FIG. 2.

FIGS. 1-3 show a conventional motor-driven scroll type compressor 1. It should be noted that FIGS. 1-3 are provided to detail a general configuration and operation of a scroll type compressor. If it understood that other configurations for the compressor 1 can be used as desired. A housing 10 includes a cylindrical first housing 11 with a cover-like second housing 12 and a shaft support portion 15. The shaft support portion 15 is provided adjacent the first housing 11 and the second housing 12. The first housing 11, the second housing 12, and the shaft support portion 15 are joined by any conventional method such as fasteners, for example. The first housing 11 may be configured to accommodate therein the fixed scroll member 16.

The first housing 11 may have a cylindrical boss 14 protruding from the center of wall 11A of the first housing 11. The shaft support portion 15 typically has an inner cylindrical portion 17 and an outer cylindrical portion 18 connected by a web portion 19. The inner cylindrical portion 17 has a central bore 20 for receiving a rotary shaft 24 therethrough. The compressor 1 has a rotation prevention pin (not depicted) for preventing a movable scroll member 22 from being rotated on its own axis.

The shaft support portion 15 and the boss 14 rotatably support the rotary shaft 24 at the opposite ends 24A, 24B thereof through radial bearings 25, 26, respectively. The bearing 25 has an outer ring 27, an inner ring 28, and a plurality of rollers 29 arranged between the rings 27 and 28. The bearing 25 is fitted in the boss 14, rotatably supporting the end 24A of the rotary shaft 24. On the other hand, the bearing 26 is fitted in the shaft support portion 15. The bearing 26 has an outer ring 30, an inner ring 35, and a plurality of rollers 36 arranged between the rings 30, 35. The rotary shaft 24 inserted through the shaft hole 19 is fitted in the inner ring 35 of the bearing 26, as shown in FIG. 1. Thus, the bearing 26 rotatably supports the end 24B of the rotary shaft 24. A seal member 32 is interposed between the shaft support portion 15 and the rotary shaft 24 and held by a circlip 33 for sealing the rotary shaft 24.

The fixed scroll member 16 has a fixed base wall 16C composed of a base wall 16A and a cylindrical peripheral wall 16B, and a fixed scroll wall 16D formed inside the peripheral wall 16B and extending axially outward from the base wall 16A along a central axis of the compressor 1.

On the other hand, the movable scroll member 22 is provided between the shaft support portion 15 and the fixed scroll member 16 and supported by a radial bearing 34. The movable scroll member 22 has a disk-shaped movable base wall 22A and a movable scroll wall 22B extending axially outward from the movable base wall 22A along the central axis of the compressor 1.

The fixed scroll member 16 and the movable scroll member 22 are moveably engaged with each other through the fixed scroll wall 16D and the movable scroll wall 22B. The distal ends of the fixed scroll wall 16D and the movable scroll wall 22B are slidable on the movable base wall 22A and the fixed base wall 16C, respectively.

Compression chambers 38 are formed between the fixed base wall 16C with the fixed scroll wall 16D of the fixed scroll member 16 and the movable base wall 22A with the movable scroll wall 22B of the movable scroll member 22. A backpressure chamber 39 faces to the end 24B of the rotary shaft 24 between the front side of the movable base wall 22A (or the opposite side of the movable base wall 22A from the compression chamber 38) and the shaft support portion 15. Furthermore, the shaft support portion 15, the peripheral wall 16B and the outermost peripheral portion of the movable scroll wall, 22B cooperate to define therebetween a suction chamber 41.

The first housing 11 has formed therein a suction region 42 formed adjacent the shaft support portion 15. The suction region 42 communicates with the suction chamber 41 through a suction passage (not depicted) formed in the shaft support portion 15. In the suction region 42, a stator 44 of an electric motor 40 is fixed on the inner peripheral surface of the first housing 11 and a rotor 45 is located inward of the stator 44 and fixed on the rotary shaft 24. The rotor 45, the stator 44 and the rotary shaft 24 cooperatively form the electric motor 40 and the rotor 45 is rotated integrally with the rotary shaft 24 when electric current is supplied to the stator 44 (when the stator 40 is energized).

The first housing 11 has formed therethrough at a position adjacent to the front end thereof an inlet (not depicted). In certain instances when the compressor 1 is part of a heating, ventilating, and air conditioning (HVAC) system (not depicted), the suction region 42, via the inlet, communicates with an evaporator (not shown) of the HVAC system. The evaporator may further communicate with an expansion valve and a condenser of the HVAC system. A low-pressure and low-temperature refrigerant gas in the HVAC system is supplied into the suction chamber 41 through the inlet, the suction region 42 and the suction passage.

A discharge chamber 47 is formed between the fixed base wall 16C and an inner surface of the second housing 12. The fixed base wall 16C has a discharge port 48 through which the compression chamber 38 is in fluid communication with the discharge chamber 47. The fixed base wall 16C has a discharge valve (not shown) for opening and closing the discharge port 48 and a retainer 49 for regulating an opening degree of the discharge valve.

As shown in FIG. 2, the second housing 12 has formed therein behind the discharge chamber 47 a fluid separation chamber 51 extending perpendicular to the central axis of the compressor 1 and also a partition wall 52 between the fluid separation chamber 51 and the discharge chamber 47. The partition wall 52 has formed therethrough a discharge port 53 interconnecting the fluid separation chamber 51 and the discharge chamber 47. A fluid separator (not depicted) may be provided in the fluid separation chamber 51 to separate a fluid (e.g., a lubricating fluid, oil, etc.) from the refrigerant gas. Typically, the fluid separator 55 has a cylindrical shape and is fitted in the fluid separation chamber 51. The fluid is separated by the action of the centrifugal force from the refrigerant gas flowing from the discharge chamber 47 into the fluid separation chamber 51 through the discharge port 53. The separated fluid falls to be reserved in the fluid separation chamber 51. An end of the fluid separation chamber 51 forms an outlet 56 through which the fluid separating chamber 51 communicates with the condenser of the HVAC system.

The fluid separation chamber 51 communicates with the backpressure chamber 39 through a fluid passage 57 so that a backpressure flow (i.e., the fluid under a discharge pressure) is supplied to the backpressure chamber 39 through the fluid passage 57. A known fluid filter 62 may be fixedly mounted in the fluid passage 57 for removing foreign matters from the fluid.

The following will describe the operation of the above-described motor-driven scroll type compressor. When the rotary shaft 24 of the motor 40 is driven to rotate by the operation of a vehicle operator, the eccentric pin 32 turns around the axis of the fixed scroll member 16. In this case, the rotation prevention pin is in sliding and rolling contact with the inner surface of the movable scroll member 22 and, accordingly, the rotation of the movable scroll member 22 on its own axis is prevented and the movable scroll member 22 makes an orbital motion around the axis of the rotary shaft 24. Thus, the compression chambers 38 are moved radially inwardly from the outer peripheral side of the fixed and movable scroll members 16, 22 toward their center by the orbital motion of the movable scroll member 22, thereby progressively reducing volume thereof. Therefore, the refrigerant gas introduced into the suction chamber 41 and then the compression chamber 38 from the evaporator through the inlet, the suction region 42 and the suction passage is compressed in the compression chamber 38. The refrigerant gas compressed to a discharge-pressure is discharged through the discharge port 48 into the discharge chamber 47 and then flows into the fluid separation chamber 51 through the discharge port 53. After the fluid is separated from refrigerant gas in the fluid separation chamber 51, the refrigerant gas is discharged from the fluid separator 55 to the condenser. Thus, the air conditioning for the vehicle is performed.

The fluid separated from the refrigerant gas falls from the fluid separator 55 to be reserved in the fluid separation chamber 51. The fluid reserved in the fluid separation chamber 51 is supplied to the backpressure chamber 39 through the fluid passage 57 together with a small amount of the refrigerant gas. While the fluid passes through the fluid passage 57, foreign matters contained in the fluid are removed therefrom by the fluid filter 62, so that foreign matters are prevented from being accumulated in a throttle (not depicted) located downstream of the fluid filter 62. A pressure in the backpressure chamber 39 is restricted to a determined pressure by the throttle in the fluid passage 57. The fluid supplied to the backpressure chamber 39 serves to lubricate any friction-generating components such as the bearing 26, the bearing 34, and the eccentric pin 32, for example, as a part of the drive for the movable scroll member 22. The pressure in the backpressure chamber 39 functions to oppose the pressure in the compression chambers 38 so as to urge the movable scroll member 22 toward the fixed scroll member 16 thereby to reduce sliding resistance between the movable base wall 22A and the shaft support portion 15 and also to secure the airtightness of the compression chambers 38.

Figure 4:
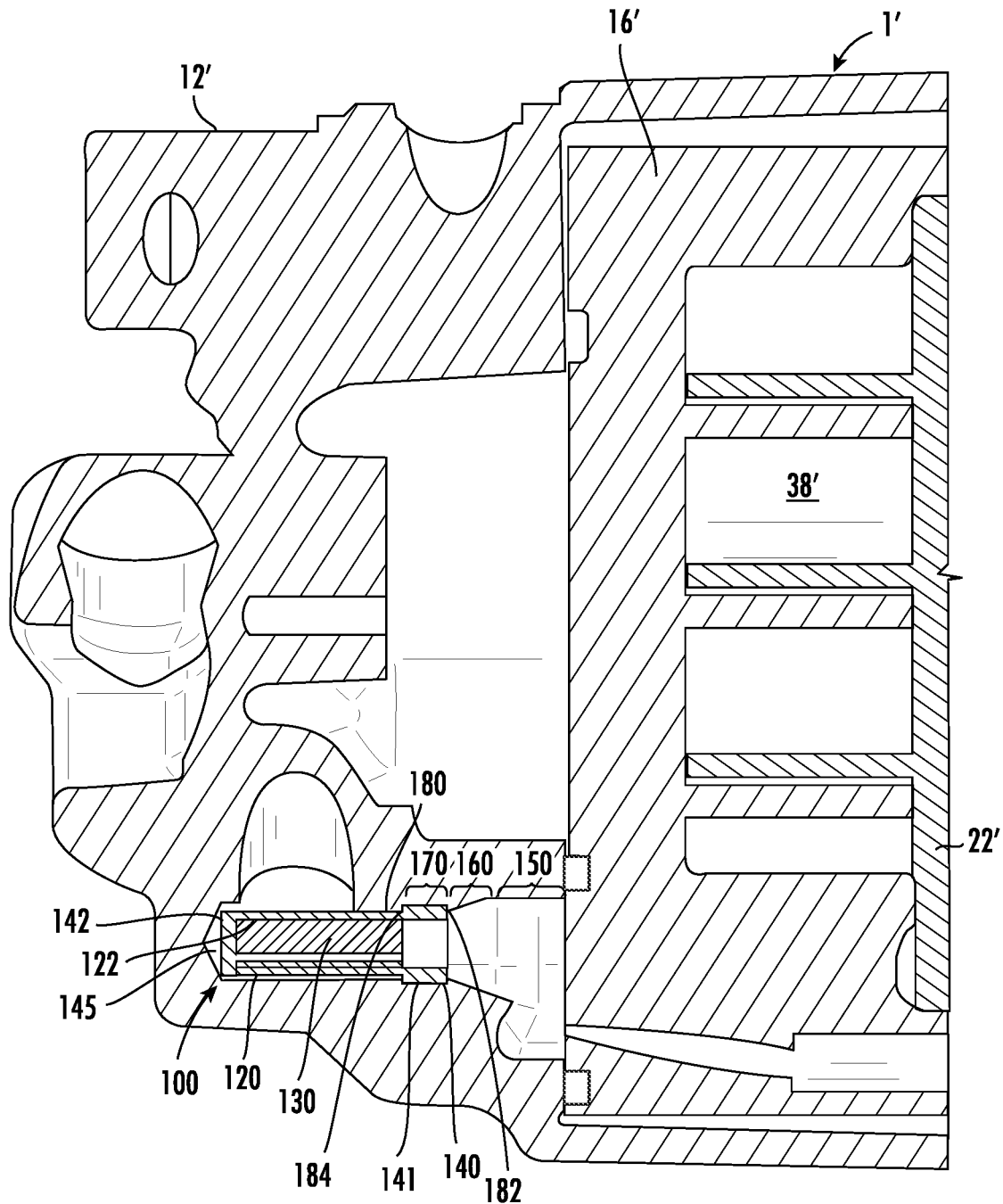
FIG. 4 is a fragmentary cross-sectional elevational view of a portion of a scroll compressor including a fluid filter according to an embodiment of the disclosure.

FIG. 4 illustrates a fluid filter 100 in accordance with an embodiment of the present disclosure. Note that similar structure to the compressor 1' to that of the compressor 1 shown in FIGS. 1-3 and described herein includes that same reference numeral with a prime symbol ('). The fluid filter 100 may be installed in a compressor 1'. It is understood that the fluid filter 100 be installed in any compressor 1' as desired such as a vapor injection (VI) type scroll compressor, for example. It should be noted that the VI type scroll compressor differs from the conventional compressor described hereinabove in that it includes a VI valve assembly between the second housing 12' and the fixed scroll 16'. Accordingly, a length of a fluid passage 145 formed in the compressor 1' is larger than a length of the fluid passage 57 of the non-VI compressor 1. The difference in length must be accounted for when determining a desired position of the fluid filter 100 within the fluid passage 145.

The fluid filter 100 may be disposed in the fluid passage 145 of the second housing 12' of the compressor 1'. The fluid filter 100 includes a body portion 120 and a filter membrane portion 130. As shown, the body portion 120 is substantially cylindrical in shape with at least one aperture 122 formed therein, although other shapes can be used as desired. As shown, an annular array of longitudinally extending apertures 122 is provided, although other configurations of the apertures 122 can be provided as desired. Also as shown, the body portion 120 is produced from a plastic, although other materials can be used as desired. If formed from a plastic, advantageously, a weight thereof is minimized. In some embodiments, the body portion 120 includes an open first end 140 and a substantially closed second end 142. In other embodiments, the second end 142 may also be substantially open if desired.

The first end 140 of the fluid filter 100 includes at least one retention feature, generally 141, formed on an outer surface 138 thereof. Functionally, the at least one retention feature 141 cooperates with a wall forming the fluid passage 145 to form a substantially fluid-tight seal therebetween and militate against blow by or leakage past the fluid filter 100, thereby causing the lubricant to flow through the filter membrane portion 130. The filter membrane portion 130 covers and is disposed in the at least one aperture 122 of the body portion 120. As shown, the filter membrane portion 130 is produced from nylon, although other materials can be used as desired. Similar to the body portion 120, by producing the filter membrane portion 130 from nylon, a weight thereof is advantageously minimized. The filter membrane portion 130 functions to permit the lubricant to flow through the at least one aperture of the body portion 120 while filtering out contaminants carried by the lubricant.

Various embodiments of the fluid filter 100 are shown in FIGS. 6A-10B. The at least one retention feature 141 can be in the form of a plurality of radially outwardly extending and circumferentially continuous rings (FIGS. 6A and 6B), an annular array of spaced apart outwardly extending bumps or semi-circular protrusions (FIGS. 7A and 7B), an annular array of spaced apart outwardly extending tabs (FIGS. 8A and 8B), an annular array of spaced apart outwardly extending ribs (FIGS. 9A and 9B), at least one radially outwardly extending collar formed continuously around the outer surface 138 (FIGS. 10A and 10B), or other protuberances as desired. In the embodiment of the fluid filter 100 shown in FIGS. 10A and 10B, the at least one retention feature 141 may comprise a first portion 143 and a second portion 144. As best seen in FIG. 10A, the first portion 143 has a substantially constant outer diameter and the second portion 144 is sloped having a generally decreasing outer diameter from the first portion 143 to the outer surface of the first end 140 of the fluid filter 100. Advantageously, the sloped second portion 144 of the at least one retention feature 141 allows for easier installation of the fluid filter 100, while providing a substantially fluid-tight seal between the inner diameter of the fluid passage 145 and the at least one retention feature 141 of the fluid filter 100.

The fluid passage 145 may be formed by a boring operation. In certain embodiments, the boring operation may be accomplished in phases. However, other machining or forming operations or methods may be used as desired. Adjacent an end of the fluid passage 145 near the fixed scroll 16', shown in FIG. 4, the fluid passage 145 may be formed by a substantially right circular cylindrical portion 150 having a substantially constant diameter. Adjacent the right circular cylinder portion 150 in a direction away from the fixed scroll 16', a substantially frustoconical portion 160 may be formed. Adjacent the frustoconical portion 160 in a direction away from the fixed scroll 16' may be a radially inwardly extending channel portion 170. As discussed hereinabove, each of these portions 150, 160, 170 may be formed by the boring operation or other operation or method. For example, the channel portion 170 may be formed with a T-tool, similar to that used for forming channels for use with snap rings. The channel portion 170 cooperates with the at least one retention feature 141 of the fluid filter 100 to properly position the fluid filter 100, hold the fluid filter 100 in place, and militate against blow by or leakage of the fluid past the fluid filter 100 without passing through the filter membrane portion 130 thereof.

To install the fluid filter 100 in the compressor 1', the fluid filter 100 may be inserted into the fluid passage 145, urged past the cylindrical portion 150, and through the frustoconical portion 160 until the at least one retention feature 141 is received and positioned within the channel portion 170.

In some embodiments, an inner diameter of the cylindrical portion 150 is substantially equal to or slightly larger than an outer diameter of the at least one retention feature 141 to facilitate insertion of the fluid filter 100 into the fluid passage 145. The fluid filter 100 can be inserted manually, automatically or semi-automatically and by hand or with a tool. An inner diameter of the frustoconical portion 160 gradually decreases from the inner diameter of the cylindrical portion 150 to an inner diameter slightly smaller than the outer diameter of the at least one retention feature 141 of the fluid filter 100. An inner diameter of the channel portion 170 is substantially equal to or slightly larger than the outer diameter of the at least one retention feature 141. An inner diameter of a remainder portion 180 of the fluid passage 145 adjacent the channel portion 170 in a direction away from the fixed scroll 16' may be substantially the same as or slightly larger than an outer diameter of the body portion 120 of the fluid filter 100, but smaller than the inner diameter of the channel portion 170. Thus, based upon the differences in the inner diameters of the portions 160, 180 of the fluid passage 145 adjacent both sides of the channel portion 170, the at least one retention feature 141 is axially constrained by shoulders 182, 184 formed on each side of the channel portion 170, thereby effectively locking the fluid filter 100 in place when fully installed. It should be noted that adjusting a location of the channel portion 170 axially one way or the other in the fluid passage 145 to adjust and provide a desired position of the fluid filter 100 relative to a port position (e.g., the discharge port 53'), and thereby adjust and provide a desired backpressure flow to the backpressure chamber 39' of the compressor 1'.

Operation of the VI type compressor 1' is similar to that described hereinabove for the compressor 1.

Figure 5:
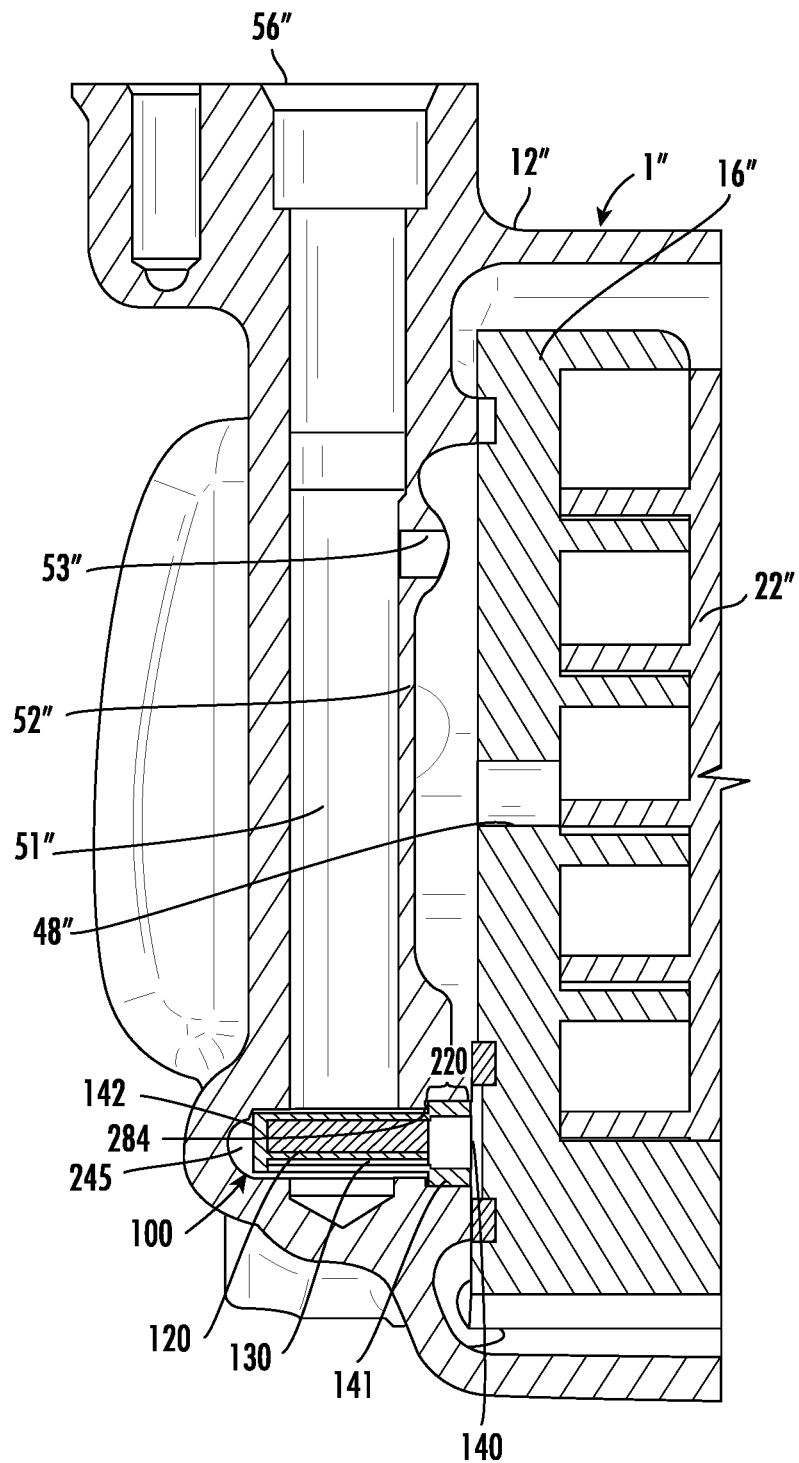
FIG. 5 is a fragmentary cross-sectional elevational view of a portion of a scroll compressor including a fluid filter according to another embodiment of the disclosure.
Figure 6A:
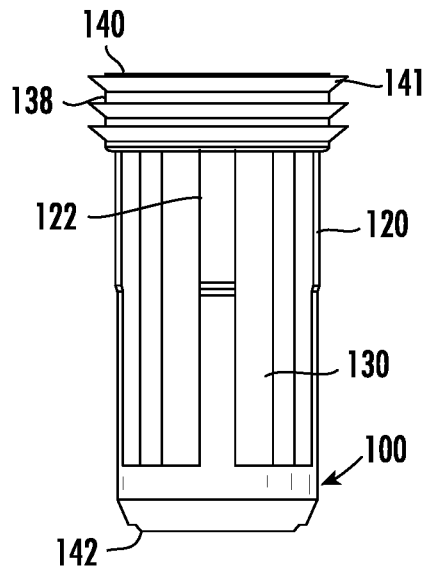
FIG. 6A is an enlarged elevational view of an embodiment of the fluid filter for the scroll compressors shown in FIGS. 4 and 5.
Figure 6B:
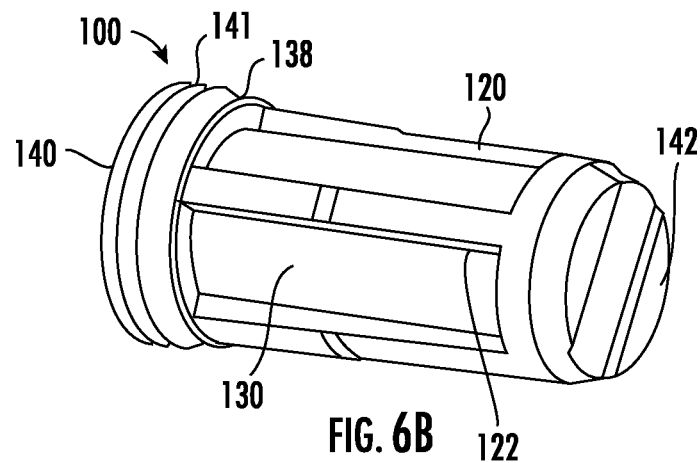
FIG. 6B is an enlarged perspective view of the fluid filter shown in FIG. 6A.
Figure 7A:
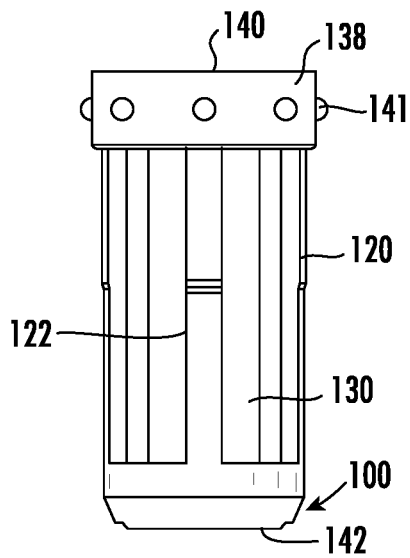
FIG. 7A is an enlarged elevational view of another embodiment of the fluid filter for the scroll compressors shown in FIGS. 4 and 5.
Figure 7B:
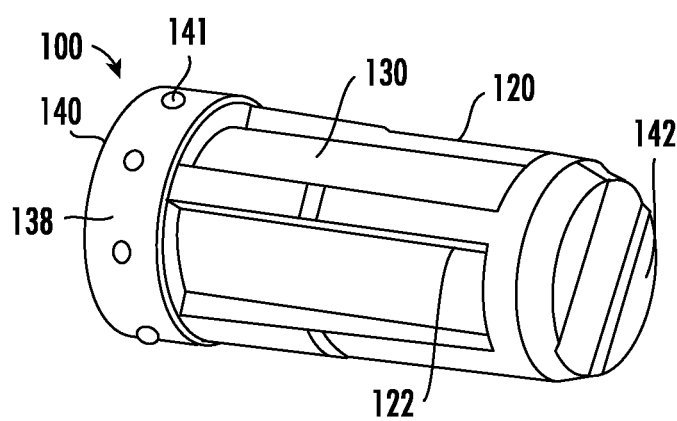
FIG. 7B is an enlarged perspective view of the fluid filter shown in FIG. 7A.
Figure 10A:
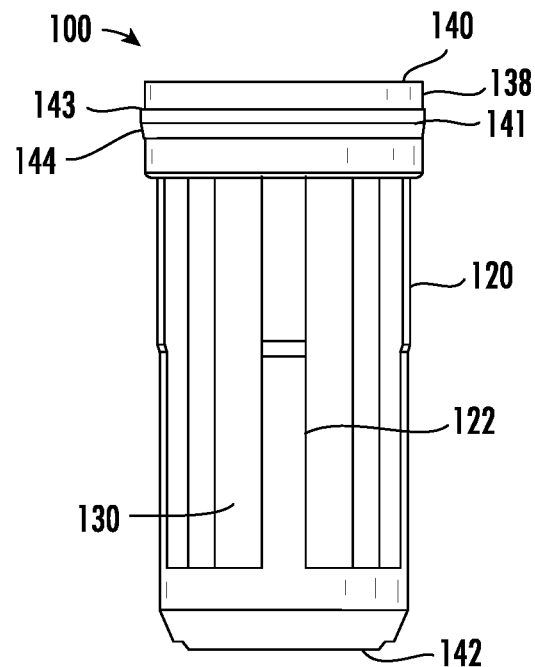
FIG. 10A is an enlarged elevational view of another embodiment of the fluid filter for the scroll compressors shown in FIGS. 4 and 5.
Figure 10B:
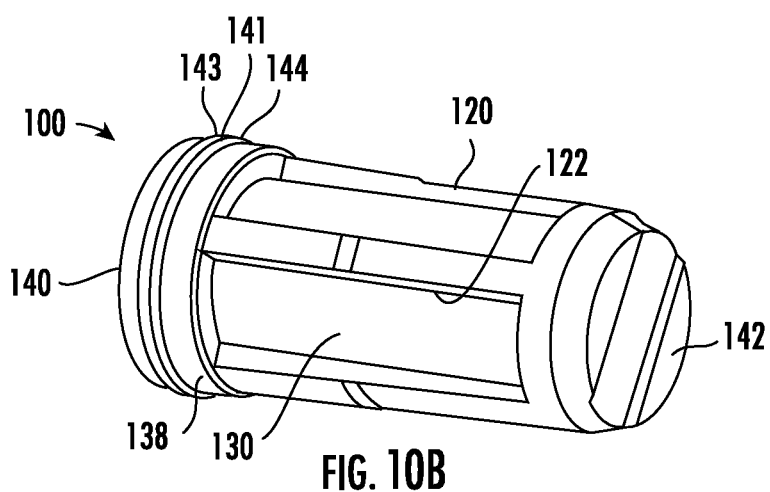
FIG. 10B is an enlarged perspective view of the fluid filter shown in FIG. 10A.

In the embodiment shown in FIG. 5, a non-VI type compressor 1" is shown with the fluid filter 100 installed therein. Note that similar structure of the compressor 1" to that of the compressor 1' shown in FIGS. 1-4 and described herein includes that same reference numeral with a double-prime symbol ("). The channel portion 220 in the compressor 1" may be formed adjacent an end of the fluid passage 245 abutting the fixed scroll 16". Accordingly, a shoulder 284 on a side of the channel portion 220 in a direction away from the fixed scroll 16" cooperates with the fixed scroll 16" to restrict axial movement of the fluid filter 100 similar to described hereinabove for the shoulders 182, 184 of the channel portion 170 of the fluid passage 145 of the compressor 1'. A remainder of the structure, function, and installation of the fluid filter 100 may be similar to described hereinabove.

Operation of the non-VI type compressor 1" is similar to that described hereinabove for the compressors 1, 1'.

Figure 11:
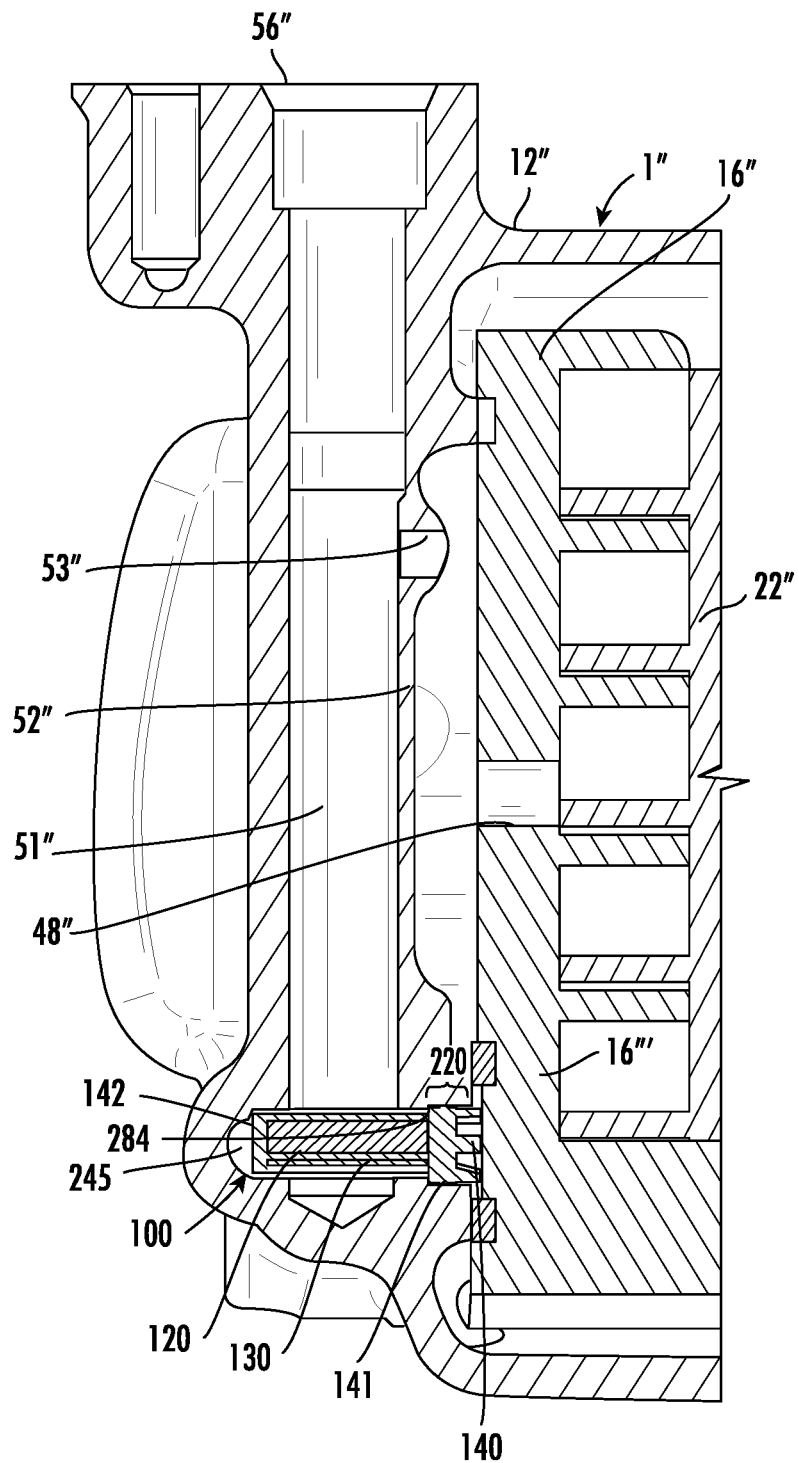
FIG. 11 is a fragmentary cross-sectional elevational view of a portion of a scroll compressor including a fluid filter according to another embodiment of the disclosure.
Figure 12A:
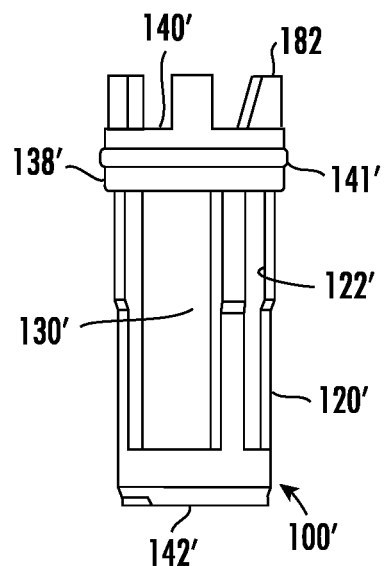
FIG. 12A is an enlarged elevational view of an embodiment of the fluid filter for the scroll compressor shown in FIG. 11.
Figure 12B:
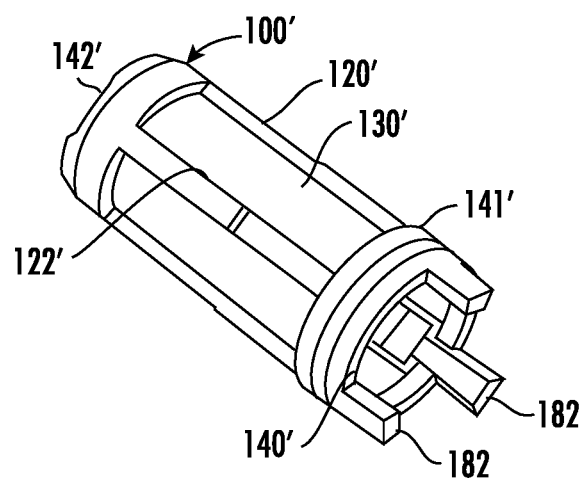
FIG. 12B is an enlarged perspective view of the fluid filter shown in FIG. 12A.

In the embodiment shown in FIG. 11, the non-VI compressor 1" may include a fluid filter 100' according to another embodiment of the present disclosure. Note that similar structure of the fluid filter 100' to that of the fluid filter 100 shown in FIGS. 1-10 and described herein includes that same reference numeral with a prime symbol ('). In this embodiment, at least one leg 182 may be provided adjacent the first end 140' of the fluid filter 100'. As shown, an annular array of spaced apart axially extending legs 182 may be provided. However, it is understood that any number of legs 182 can be used as desired. The at least one leg 182 may be employed to fix a desired position of the fluid filter 100' based upon a position of the fixed scroll 16". Further, the at least on leg 182 provides an axial standoff from the fixed scroll 16" as an end of the at least one leg 182 abuts a surface of the fixed scroll 16". A remainder of the structure, function, and installation of the fluid filter 100' is similar to described hereinabove for the fluid filter 100.

The compressors 1', 1" having one of the fluid filters 100, 100' with a simplified structure is easy to manufacture, thereby minimizing production costs. Press fitting, staking, and other methods used during assembly and installation in the prior art are not required. The novel fluid filters 100, 100' of the instant patent application can be used in multiple compressors, thereby eliminating the need for a special design for each compressor, thereby minimizing overall part cost. Furthermore, in the compressors 1', 1", a sufficient amount of fluid is supplied from the fluid separation chamber 51', 51" to the compressor 1', 1", respectively, and therefore, the durability of the compressor 1', 1" is maximized.

From the foregoing description, one ordinarily skilled in the art can easily ascertain the essential characteristics of this present disclosure and, without departing from the spirit and scope thereof, can make various changes and modifications to the present disclosure to adapt it to various usages and conditions.

What is claimed is:

1. A compressor, comprising:
   a housing including a fluid passage formed therein, wherein the fluid passage includes a channel portion, a remainder portion adjacent the channel portion, and shoulders formed on each side of the channel portion, wherein one of the shoulders is formed between the channel portion and the remainder portion, and wherein the fluid passage further includes a right circular cylindrical portion having a constant diameter and a frusto-conical portion formed adjacent the right circular cylinder portion in a direction away from a fixed scroll of the compressor; and
   a fluid filter disposed in the fluid passage, wherein the fluid filter includes:
      a body portion including at least one retention feature configured to permit the fluid filter to be fixedly coupled in the compressor at a desired position within the fluid passage, wherein the at least one retention feature is received in the channel portion of the fluid passage, and wherein an inner diameter of the remainder portion is smaller than an inner diameter of the channel portion and an outer diameter of the at least one retention feature, so that movement of the fluid filter is prevented as the at least one retention feature is axially constrained by the shoulders formed on each side of the channel portion; and
      a membrane portion at least partially disposed in the body portion.

2. The compressor of claim 1, wherein the body portion further includes at least one aperture formed therein.

3. The compressor of claim 1, wherein the at least one retention feature is configured to cooperate with a surface of the compressor to form a substantially fluid-tight seal therebetween.

4. The compressor of claim 1, wherein the at least one retention feature is at least one radially outwardly extending protuberance.

5. The compressor of claim 1, wherein the at least one retention feature is at least one radially outwardly extending ring.

6. The compressor of claim 1, wherein the at least one retention feature is an annular array of spaced apart protuberances.

7. The compressor of claim 1, wherein the at least one retention feature is formed continuously around an outer surface of the body portion.

8. The compressor of claim 1, wherein the at least one retention feature includes a sloped portion to facilitate installation of the fluid filter in the compressor.

9. The compressor of claim 1, wherein the body portion further includes at least one leg extending outwardly therefrom.

* * * * *